(12) United States Patent
Wu et al.

(10) Patent No.: US 11,551,169 B2
(45) Date of Patent: Jan. 10, 2023

(54) INDUSTRIAL DEVICE MATCHING METHOD AND APPARATUS

(71) Applicant: Siemens Aktiengesellschaft, Munich (DE)

(72) Inventors: Chao Hua Wu, Beijing (CN); Cong Chao Li, Jiangsu (CN); Daniel Schneegass, Beijing (CN); Ruo Gu Sheng, Beijing (CN); Peng Wei Tian, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 67 days.

(21) Appl. No.: 16/962,598

(22) PCT Filed: Sep. 29, 2018

(86) PCT No.: PCT/CN2018/108869
§ 371 (c)(1),
(2) Date: Jul. 16, 2020

(87) PCT Pub. No.: WO2020/062186
PCT Pub. Date: Apr. 2, 2020

(65) Prior Publication Data
US 2020/0401965 A1 Dec. 24, 2020

(51) Int. Cl.
*G06Q 10/06* (2012.01)
(52) U.S. Cl.
CPC .............................. *G06Q 10/06313* (2013.01)
(58) Field of Classification Search
CPC ..................................................... G06Q 10/06
See application file for complete search history.

(56) References Cited

U.S. PATENT DOCUMENTS

| 9,325,688 | B1* | 4/2016 | Hansen | H04L 63/08 |
| 9,362,746 | B2 | 6/2016 | Shaffer et al. | |

(Continued)

FOREIGN PATENT DOCUMENTS

| CN | 105589349 A | 5/2016 |
| CN | 107330212 A | 11/2017 |

(Continued)

OTHER PUBLICATIONS

International Search Report PCT/ISA/210 for International Application No. PCT/CN2018/108869 dated Jun. 24, 2019.

(Continued)

*Primary Examiner* — Kurtis Gills
(74) *Attorney, Agent, or Firm* — Harness, Dickey & Pierce, P.L.C.

(57) ABSTRACT

An industrial device matching method and apparatus are used for acquiring a corresponding relationship between industrial devices in different industrial data sources to provide basis for industrial data analysis. The method, in an embodiment, includes collecting data of at least two industrial data sources; determining a first relationship between various industrial devices in each industrial data source, and determining a first relationship topology between the industrial devices in the industrial data source; and comparing the first relationship topologies corresponding to various industrial data sources, to determine a first corresponding relationship between industrial devices in industrial data sources, the first corresponding relationship enabling the first relationship topologies corresponding to at least two industrial data sources to be similar. A relationship between industrial devices in different industrial data sources is determined by comparing a relationship topology between devices according to the similarity of relationships between the devices in different industrial data sources.

17 Claims, 5 Drawing Sheets

(56) References Cited

U.S. PATENT DOCUMENTS

| | | |
|---|---|---|
| 2013/0091258 A1 | 4/2013 | Shaffer et al. |
| 2014/0123126 A1* | 5/2014 | Hsu .......................... G06F 8/61 |
| | | 717/174 |
| 2014/0280804 A1* | 9/2014 | Thodati ............... H04L 41/0806 |
| | | 709/222 |
| 2014/0337429 A1 | 11/2014 | Asenjo et al. |
| 2015/0066979 A1 | 3/2015 | Zhang et al. |
| 2015/0241482 A1* | 8/2015 | Sonderegger .......... G06Q 50/06 |
| | | 702/65 |
| 2016/0132538 A1 | 5/2016 | Bliss et al. |
| 2016/0292895 A1 | 10/2016 | Billi et al. |
| 2017/0351226 A1 | 12/2017 | Bliss et al. |
| 2018/0139104 A1 | 5/2018 | Seddigh et al. |
| 2018/0316594 A1* | 11/2018 | Wu ......................... H04L 45/64 |

FOREIGN PATENT DOCUMENTS

| | | |
|---|---|---|
| EP | 2801935 A1 | 11/2014 |
| EP | 3076311 A1 | 10/2016 |
| WO | WO-2013137884 A1 | 9/2013 |

OTHER PUBLICATIONS

Written Opinion of the International Searching Authority PCT/ISA/237 for International Application No. PCT/CN2018/108869 dated Jun. 24, 2019.

Extended European Search Report for European Patent Application No. 18935251.1 dated Jun. 16, 2021.

* cited by examiner

INDUSTRIAL DEVICE MATCHING METHOD AND APPARATUS

PRIORITY STATEMENT

This application is the national phase under 35 U.S.C. § 371 of PCT International Application No. PCT/CN2018/108869 which has an International filing date of Sep. 29, 2018, which designated the United States of America, the entire contents of which are hereby incorporated by reference herein, in the entirety and for all purposes.

BACKGROUND

Field

Embodiments of the present application generally relate to the technical field of industry, and in particular to an industrial device matching method and apparatus.

Background

Nowadays, more and more industrial devices such as sensors and industrial controllers are used in factories. In the same factory, the information of these devices may be stored in different systems respectively, e.g., the information is stored in a distributed control system and an enterprise resource planning (ERP) system respectively. These systems are usually provided by different suppliers and used by different people. Therefore, information expression modes of the same industrial device indifferent systems are often different. For example, in a database of the distributed control system, an industrial device is usually named after a numeric string or a code string such as TB_1234A. In the ERP system, the name of an industrial device usually has semantics of a natural language such as Temperature_Sensor_A in_Compressor B.

In addition, the same type of industrial devices may be used in different factories, but different factories may adopt different distributed control systems. In the respective distributed control systems, information expression modes of these devices may also be different.

During industrial data analysis, it is usually necessary to acquire information of industrial devices from a plurality of industrial data sources such as information of industrial devices from a distributed control system and an ERP system in the same factory or information of industrial devices from distributed control systems of different factories. During comparison analysis, it is necessary to match industrial devices for different data sources, so as to determine a corresponding relationship between industrial devices in different data sources.

A current industrial device matching method is to install a radio frequency identification (RFID) tag on an industrial device. The method increases the device cost, and also needs to perform device installation and factory transformation with a great number of manpower and material resources.

Another method for determining industrial device matching is to manually annotate a corresponding relationship between industrial devices in different systems. This method needs to consume a great number of manpower resources, is low in efficiency, and is error-prone.

SUMMARY

Embodiments of the present invention provide an industrial device matching method and apparatus, used for simply acquiring a corresponding relationship between industrial devices in different industrial data sources to provide basis for industrial data analysis.

A first embodiment provides an industrial device matching method. The method includes: collecting data of at least two industrial data sources; for each of the at least two industrial data sources, determining a first relationship between various industrial devices in the industrial data source, and determining a first relationship topology between the industrial devices in the industrial data source according to the determined first relationship between various industrial devices in the industrial data source; and comparing the first relationship topologies corresponding to the at least two industrial data sources, so as to determine a first corresponding relationship between industrial devices in industrial data sources, the first corresponding relationship enabling the first relationship topologies corresponding to the at least two industrial data sources to be similar.

A second embodiment provides an industrial device matching apparatus. The apparatus may include: a data collection module, configured to collect data of at least two industrial data sources; a relationship determination module, configured to determine, for each of the at least two industrial data sources, a first relationship between various industrial devices in the industrial data source; a topology determination module, configured to determine, for each of the at least two industrial data sources, a first relationship topology between the industrial devices in the industrial data source according to the determined first relationship between various industrial devices in the industrial data source; and a comparison module, configured to compare the first relationship topologies corresponding to the at least two industrial data sources, so as to determine a first corresponding relationship between industrial devices in industrial data sources, the first corresponding relationship enabling the first relationship topologies corresponding to the at least two industrial data sources to be similar.

A third embodiment provides an industrial device matching apparatus. The apparatus may include: at least one memory, configured to store a computer-readable code; and at least one processor, configured to call the computer-readable code to execute the method provided in the first embodiment or any possible implementation manner of the first embodiment.

A fourth embodiment provides a computer-readable medium. The computer-readable medium has a computer-readable instruction stored thereon. When the computer-readable instruction is executed by a processor, the processor is enabled to execute the method provided in the first embodiment or any possible implementation manner of the first embodiment.

A fifth embodiment provides a computer program, including a computer-readable instruction. When the computer-readable instruction is executed by a processor, the processor is enabled to execute the method provided in the first embodiment or any possible implementation manner of the first embodiment.

A sixth embodiment provides a computer program product. The computer program product is stored on a computer-readable medium tangibly and includes a computer-readable instruction. When the computer-readable instruction is executed by a processor, the processor is enabled to execute the method provided in the first embodiment or any possible implementation manner of the first embodiment.

DRAWING REFERENCE SIGN LIST

Figure 1:
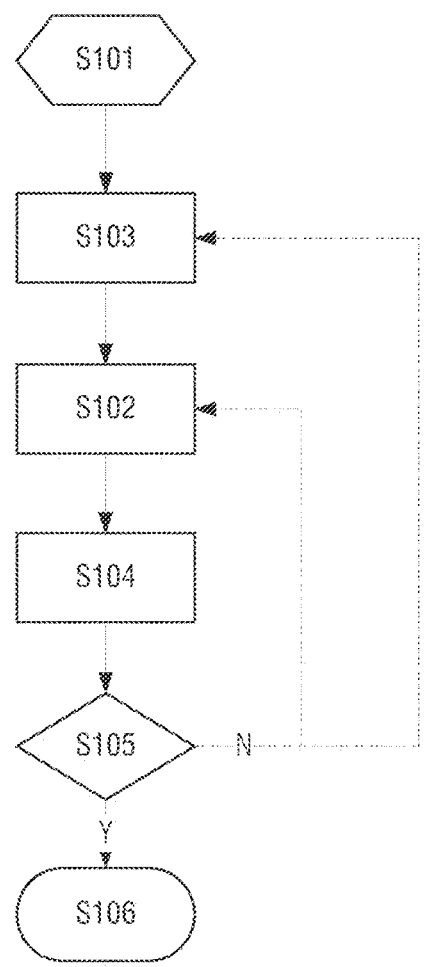
FIG. 1 is a flowchart of an industrial device matching method provided in an embodiment of the present invention.

S101: Collect data of different industrial data sources
S102: Determine a relationship between various industrial devices in each industrial data source
S103: Determine a relationship topology between the industrial devices in each industrial data source according to the relationship determined in S102
S104: Compare relationship topologies corresponding to at least two industrial data sources, so as to determine a corresponding relationship between industrial devices in industrial data sources

| | |
|---|---|
| S105: Check the corresponding relationship | |
| S106: Determine a final corresponding relationship | |
| 11: First industrial data source | 12: Second industrial data source |
| 21: Relationship topology of first industrial data source | |
| 22: Relationship topology of second industrial data source | 30: Final corresponding relationship |
| 601: Data collection module | 602: Relationship determination module |
| 603: Topology determination module | |
| 604: Comparison module | 605: Check module |
| 606: Memory | |
| 607: Processor | |

DETAILED DESCRIPTION OF EXAMPLE EMBODIMENTS

A first embodiment provides an industrial device matching method. The method includes: collecting data of at least two industrial data sources; for each of the at least two industrial data sources, determining a first relationship between various industrial devices in the industrial data source, and determining a first relationship topology between the industrial devices in the industrial data source according to the determined first relationship between various industrial devices in the industrial data source; and comparing the first relationship topologies corresponding to the at least two industrial data sources, so as to determine a first corresponding relationship between industrial devices in industrial data sources, the first corresponding relationship enabling the first relationship topologies corresponding to the at least two industrial data sources to be similar.

A corresponding relationship between industrial devices in different industrial data sources is determined by comparing a relationship topology between the industrial devices according to the similarity of relationships between the industrial devices in different industrial data sources. The method has the advantages of simplicity, result accuracy and the like.

Alternatively, when determining a relationship between various industrial devices in the industrial data source, at least one of the following relationships between various industrial devices in the industrial data source may be determined:

a Pearson's correlation coefficient;
a frequency of co-occurrence in the industrial data source; and
a positional relationship in the industrial data source.

Here, several criteria for measuring a relationship between industrial devices are provided.

Alternatively, after determining the first corresponding relationship, the method may further include the following steps: checking a local part in the first corresponding relationship; if a check result is wrong, for each of at least two industrial data sources, determining a second relationship between various industrial devices in the industrial data source, and determining a second relationship topology between the industrial devices in the industrial data source according to the determined second relationship between various industrial devices in the industrial data source; and comparing the second relationship topologies corresponding to the at least two industrial data sources, so as to determine a second corresponding relationship between industrial devices in industrial data sources, the second corresponding relationship enabling the second relationship topologies corresponding to the at least two industrial data sources to be similar, wherein the second relationship is different from the first relationship, and/or a comparison method adopted for comparing the second relationship topologies corresponding to the at least two industrial data sources is different from a comparison method adopted for comparing the first relationship topologies corresponding to the at least two industrial data sources.

Different relationship measurement criteria or different topology comparison methods are adopted to determine a corresponding relationship between industrial devices in industrial data sources, so as to achieve the purpose of checking a comparison result.

Alternatively, the at least two industrial data sources are data sources in different systems in the same factory, and the at least two industrial data sources involve part of or all industrial devices in the factory; or, the at least two industrial data sources are data sources in different factories in which industrial devices have the similar layout, and the at least two industrial data sources involve part of or all industrial devices in the factories.

A second embodiment provides an industrial device matching apparatus. The apparatus may include: a data collection module, configured to collect data of at least two industrial data sources; a relationship determination module, configured to determine, for each of the at least two industrial data sources, a first relationship between various industrial devices in the industrial data source; a topology determination module, configured to determine, for each of the at least two industrial data sources, a first relationship topology between the industrial devices in the industrial data source according to the determined first relationship between various industrial devices in the industrial data source; and a comparison module, configured to compare the first relationship topologies corresponding to the at least two industrial data sources, so as to determine a first corresponding relationship between industrial devices in industrial data sources, the first corresponding relationship enabling the first relationship topologies corresponding to the at least two industrial data sources to be similar.

A corresponding relationship between industrial devices in different industrial data sources is determined by comparing a relationship topology between the industrial devices according to the similarity of relationships between the industrial devices in different industrial data sources. The method has the advantages of simplicity, result accuracy and the like.

Alternatively, the relationship determination module is specifically configured to determine at least one of the following relationships between various industrial devices in the industrial data source:

a Pearson's correlation coefficient;

a frequency of co-occurrence in the industrial data source; and a positional relationship in the industrial data source.

Here, several criteria for measuring a relationship between industrial devices are provided.

Alternatively, the apparatus may further include a check module, configured to check a local part in the first corresponding relationship after the comparison module determines the first corresponding relationship. The relationship determination module is further configured to determine, for each of the at least two industrial data sources, a second relationship between various industrial devices in the industrial data source if a check result is wrong. The topology determination module is further configured to determine a second relationship topology between the industrial devices in the industrial data source according to the second relationship, determined by the relationship determination module, between various industrial devices in the industrial data source. The comparison module is further configured to compare the second relationship topologies corresponding to the at least two industrial data sources, so as to determine a second corresponding relationship between industrial devices in industrial data sources, the second corresponding relationship enabling the second relationship topologies corresponding to the at least two industrial data sources to be similar, wherein the second relationship is different from the first relationship, and/or, a comparison method adopted for comparing, by the comparison module, the second relationship topologies corresponding to the at least two industrial data sources is different from a comparison method adopted for comparing the first relationship topologies corresponding to the at least two industrial data sources.

Different relationship measurement criteria or different topology comparison methods are adopted to determine a corresponding relationship between industrial devices in industrial data sources, so as to achieve the purpose of checking a comparison result.

Alternatively, the at least two industrial data sources are data sources in different systems in the same factory, and the at least two industrial data sources involve part of or all industrial devices in the factory; or, the at least two industrial data sources are data sources in different factories in which industrial devices have the similar layout, and the at least two industrial data sources involve part of or all industrial devices in the factories.

A third embodiment provides an industrial device matching apparatus. The apparatus may include: at least one memory, configured to store a computer-readable code; and at least one processor, configured to call the computer-readable code to execute the method provided in the first embodiment or any possible implementation manner of the first embodiment.

A fourth embodiment provides a computer-readable medium. The computer-readable medium has a computer-readable instruction stored thereon. When the computer-readable instruction is executed by a processor, the processor is enabled to execute the method provided in the first embodiment or any possible implementation manner of the first embodiment.

A fifth embodiment provides a computer program, including a computer-readable instruction. When the computer-readable instruction is executed by a processor, the processor is enabled to execute the method provided in the first embodiment or any possible implementation manner of the first embodiment.

A sixth embodiment provides a computer program product. The computer program product is stored on a computer-readable medium tangibly and includes a computer-readable instruction. When the computer-readable instruction is executed by a processor, the processor is enabled to execute the method provided in the first embodiment or any possible implementation manner of the first embodiment.

As previously mentioned, when industrial data from different industrial data sources is analyzed, it is necessary to acquire a corresponding relationship between industrial devices in different industrial data sources. In the embodiment of the present invention, a large number of experiments and researches prove that even if information expression modes of industrial devices for different industrial data sources are different, relationships between the industrial devices are similar. Therefore, in the embodiment of the present invention, a relationship between industrial devices for each industrial data source is determined, so as to obtain a relationship topology between the industrial devices corresponding to the industrial data source; and by comparing relationship topologies between different industrial data sources, an optimal corresponding relationship between industrial devices between industrial data sources is found, so that the relationship topologies corresponding to different industrial data sources are closest. A corresponding relationship between industrial devices in different industrial data sources is determined by comparing a relationship topology between the industrial devices according to the similarity of relationships between the industrial devices in different industrial data sources. The method has the advantages of simplicity, result accuracy and the like.

The method and the device provided in the embodiment of the present invention will be described in detail below with reference to the drawings.

As shown in FIG. 1, an industrial device matching method provided in the embodiment of the present invention may include the following steps:

S101: Collect data of different industrial data sources.

Figure 4:
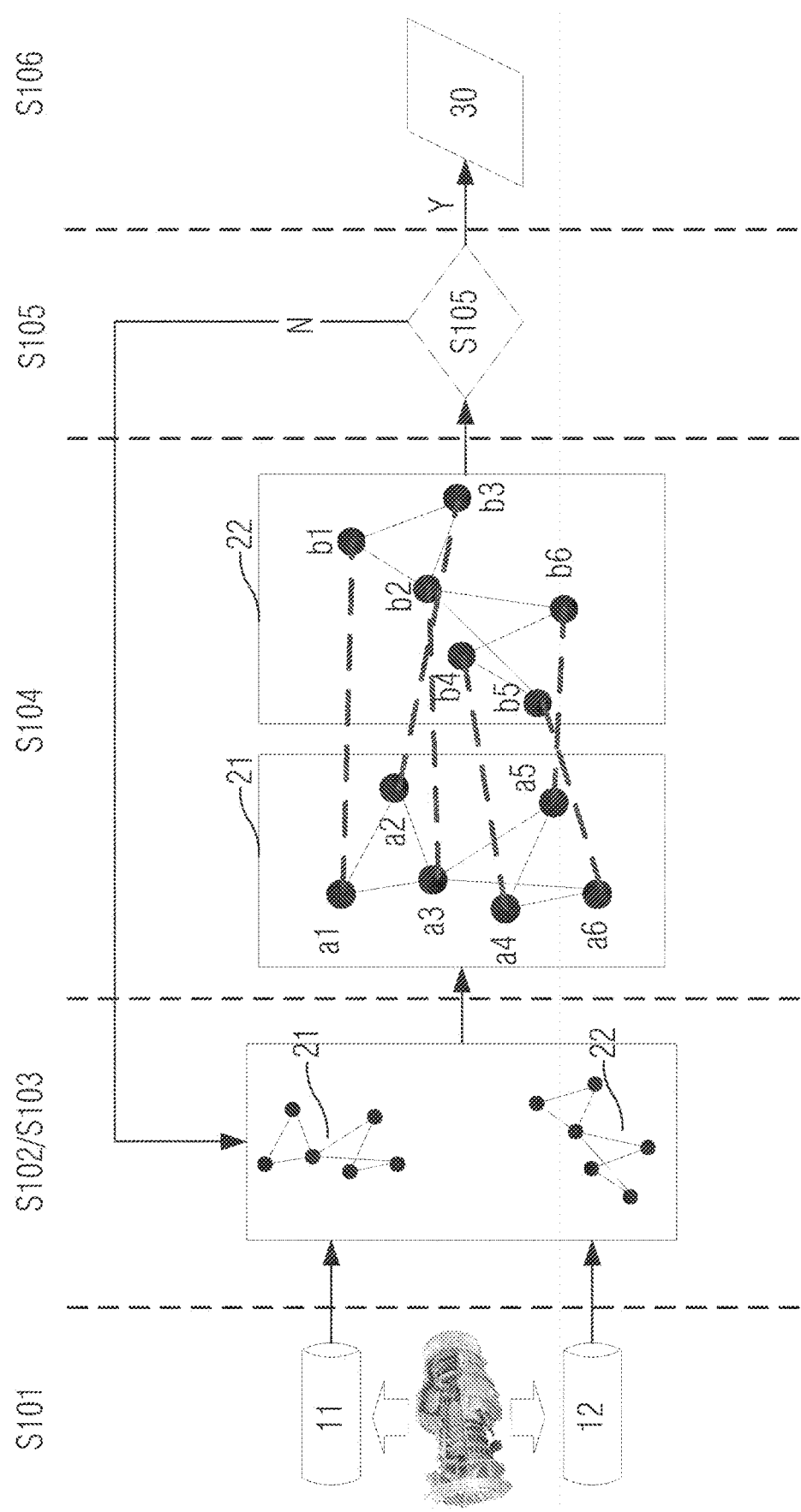
FIG. 4 is a schematic diagram of matching industrial devices between industrial data sources of different systems in the same factory in an embodiment of the present invention.
Figure 5:
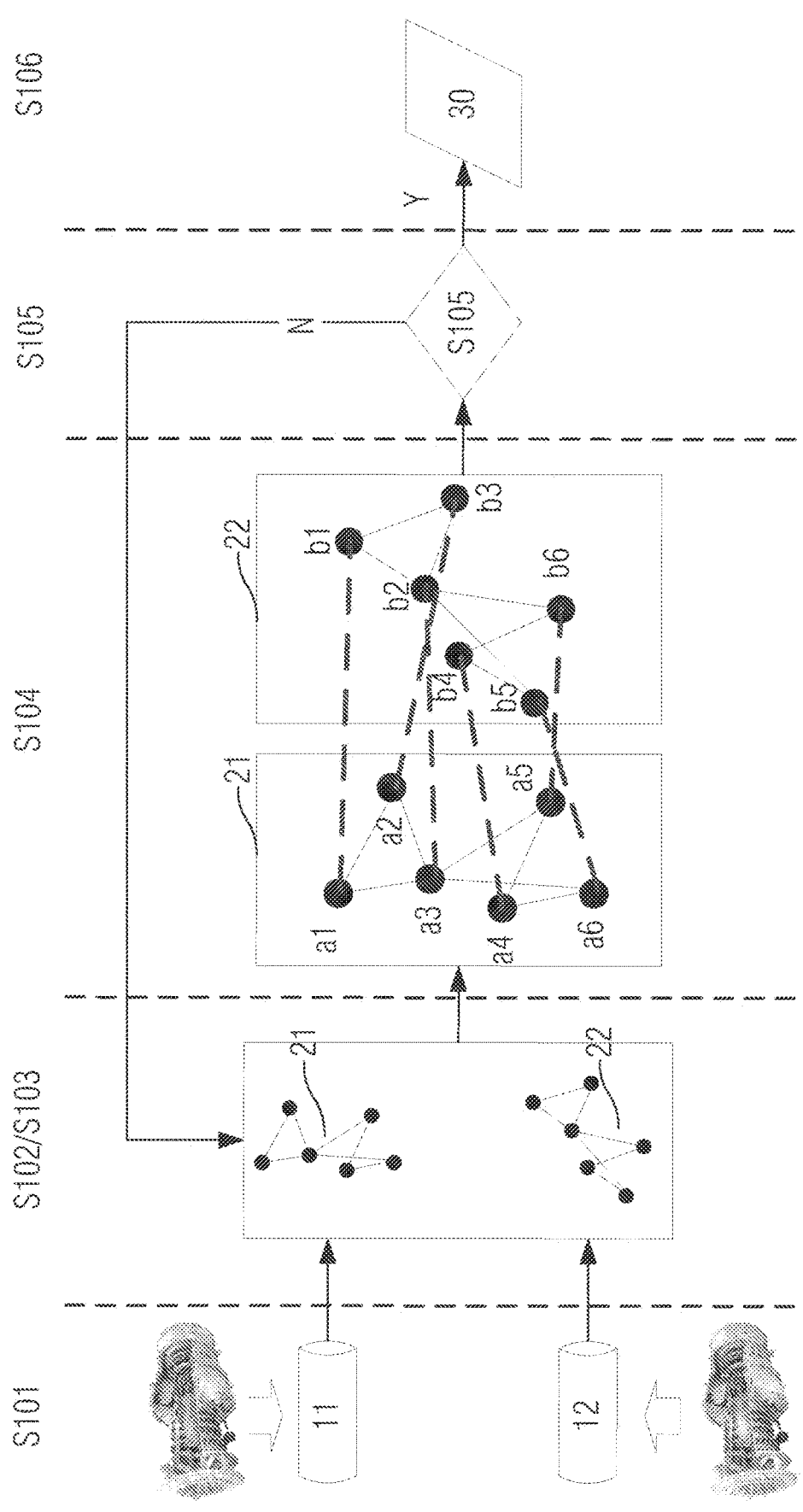
FIG. 5 is a schematic diagram of matching industrial devices between industrial data sources in different factories in an embodiment of the present invention.

For example, information of industrial devices in a distributed control system and an ERP system in the same factory may be regarded as two different industrial data sources (an industrial data source 11 and an industrial data source 12 as shown in FIG. 4). For another example, information of industrial devices in distributed control systems in different factories may be regarded as different industrial data sources (an industrial data source 11 and an industrial data source 12 as shown in FIG. 5).

Collected data may be sensor data, maintenance records, blueprint and the like. These data may be associated with one industrial device, or may be associated with multiple devices with the same type.

The industrial data sources may involve part of or all industrial devices in a factory. Alternatively, when the industrial data sources are data sources indifferent factories, industrial devices in these factories have the similar layout.

S102: Determine a relationship between various industrial devices in each industrial data source.

A large number of experiments and researches prove that even if information expression modes of industrial devices for different industrial data sources are different, relationships between the industrial devices are similar. For example, data collected by two sensors for measuring the vibration of the same device is usually similar (the data may be stored in a database of a distributed control system), and the two sensors frequently occur in maintenance records at the same time (these maintenance records may exist in an ERP system, in other implementation manners, the maintenance records may also exist in other systems, e.g., in an electronic document, and in some other implementation manners, the maintenance records may also be recorded manually by a maintainer and then sorted into electronic data). The names of the two sensors in the distributed control system and the ERP system may be different, but relationships between the two sensors in the two systems are the same.

Figure 2:
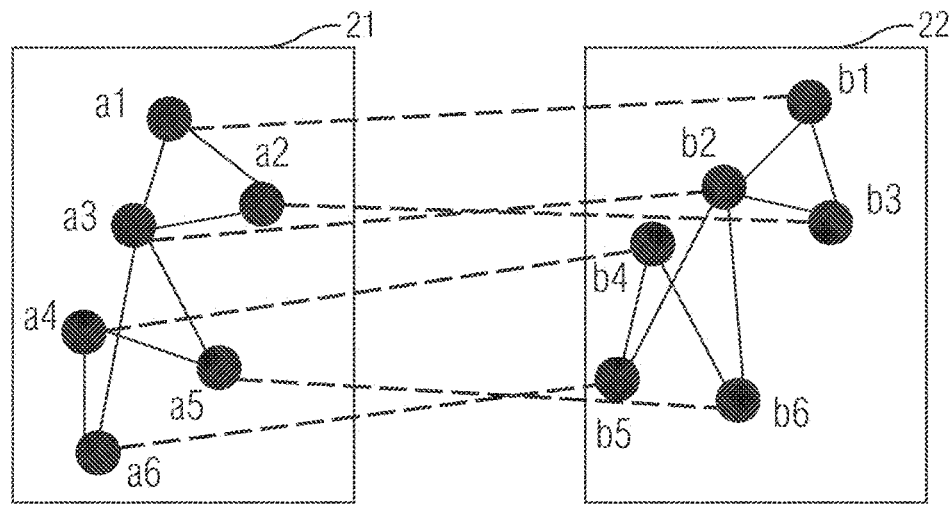
FIG. 2 is a schematic diagram of accurately matching industrial devices between two industrial data sources in an embodiment of the present invention.
Figure 3:
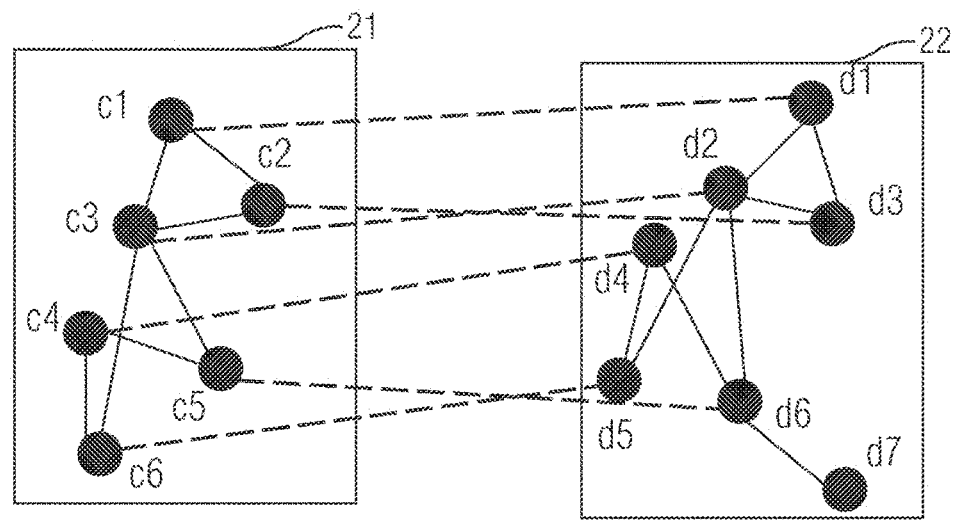
FIG. 3 is a schematic diagram of approximately matching industrial devices between two industrial data sources in an embodiment of the present invention.

FIG. 2 and FIG. 3 illustrate a relationship between industrial devices in a factory with a graph. The industrial devices are vertexes of the graph, and a connection line between the vertexes illustrates the relationship between the industrial devices. Alternatively, as the relationship between two industrial devices is closer, a connection line between vertexes corresponding to the two industrial devices is shorter. Alternatively, the relationship between industrial devices may be represented by a Pearson's correlation coefficient, a frequency of co-occurrence of industrial devices in an industrial data source, and a positional relationship between various industrial devices in an industrial data source such as blueprint.

For example, a compressor in a factory is controlled by a plurality of programmable logic controllers (PLCs), wherein these PLCs are PLC a, PLC b and PLC c, respectively. The Pearson's correlation coefficient is taken as an example. In S102, the Pearson's correlation coefficient between PLC a and PLC b may be 0.8, the Pearson's correlation coefficient between PLC b and PLC c may be 0.6, and the Pearson's correlation coefficient between PLC c and PLC a may be 0.4.

Here, for example, there are 100 industrial devices in a factory. "A relationship between various industrial devices in an industrial data source" described above may be any one of the following situations. But, it is merely demonstrative here, instead of being limitative.

1. A relationship between every two industrial devices among these 100 industrial devices.

2. A relationship between every two industrial devices among a part of these 100 industrial devices such as 50 industrial devices.

3. A relationship between every two industrial devices in each of a plurality of groups, such as 5 groups, of these 100 industrial devices and a relationship between every two groups among the 5 groups.

The Pearson's correlation coefficient represents a relationship between two industrial devices or two groups. A particular case of a relationship between devices or components is that the Pearson's correlation coefficient is 0.

S103: Determine a relationship topology between the industrial devices in each industrial data source according to the relationship determined in S102. Relationship topologies 21 and 22 may be as shown in FIG. 2 and FIG. 3.

By still taking the foregoing PLC a, b and c as an example, a relationship topology among three PLCs for controlling the compressor may be represented by using the following matrix:

$$\begin{bmatrix} 1 & 0.8 & 0.4 \\ 0.8 & 1 & 0.6 \\ 0.4 & 0.6 & 1 \end{bmatrix}$$

S104: Compare relationship topologies corresponding to at least two industrial data sources, so as to determine a corresponding relationship between industrial devices in industrial data sources. The determined corresponding relationship should enable the relationship topologies corresponding to the at least two industrial data sources to be similar.

For example, as shown in FIG. 2, a corresponding relationship between vertexes of a graph in two relationship topologies 21 and 22 in FIG. 2 is searched, so that the relationship topologies corresponding to the two industrial data sources is similar as much as possible. The corresponding relationship between industrial devices may be searched in multiple manners.

For example, adjacent matrices of two relationship topologies are represented by A and B respectively, and an optimal corresponding relationship between industrial devices may be obtained by solving $\min\|PAP^T-B\|$, where Matrix P is a permutation matrix.

FIG. 2 illustrates a situation of accurately matching industrial devices between two industrial data sources, and FIG. 3 illustrates a situation of approximately matching industrial devices between two industrial data sources. From the foregoing description, it can be seen that in the embodiment of the present invention, it is unnecessary to know information such as a naming rule of an industrial device in advance for matching industrial devices, and it is only necessary to collect data including information of a relationship between the industrial devices.

S105: Check the corresponding relationship.

Alternatively, it may also be checked whether the corresponding relationship, obtained in S104, between industrial devices is correct by performing S105. If so, it is determined that the corresponding relationship obtained in S104 is a final corresponding relationship 30. If not, S102 may be returned to re-determine a relationship between industrial devices in each industrial data source, S103 is performed to re-determine a relationship topology between industrial devices in each industrial data source, and S104 is performed to re-compare the relationship topology between industrial devices in various industrial data sources, so as to re-determine a corresponding relationship between industrial devices in various industrial data sources. When S102 is re-performed, the adopted relationship measurement method may be different from the previous method; and moreover, when relationship topologies corresponding to different industrial data sources are compared, the adopted comparison method may also be different from the previous comparison method.

When the corresponding relationship is checked, part of industrial devices may be randomly selected, and a manual manner is adopted to check whether the corresponding relationship between these industrial devices is correct.

S106: Determine a final corresponding relationship 30.

An application scene 1 of the embodiment of the present invention is introduced below in conjunction with FIG. 4.

Thousands of sensors may be deployed in a modern factory and configured to monitor a device operating situation or a production process. Sensor data is stored in a certain database. In addition, events associated with these sensors are also recorded in documents. These documents are edited by using a natural language, and therefore the names of the sensors in these documents are different from the names of sensors in the database. If a user wants to jointly analyze information from the database and these documents, it is necessary to identify a corresponding relationship between sensors of the two different industrial data sources. For example, when a sensor data mode corresponding to a certain fault mode needs to be found, it is necessary to jointly analyze sensor data and maintenance records.

The relationship between the sensors may be determined according to the sensor data. For example, the relationship between the sensors is described by using a Pearson's correlation coefficient. By taking the Pearson's correlation coefficient as an input of adjacent matrices, the relationship topology between the sensors may be determined. Similarly, the relationship between the sensors may be determined according to the foregoing documents. For example, a frequency of co-occurrence of several sensors in a document may be used for describing the relationship between these sensors to further determine the relationship topology between the sensors. In the sensor data and the document, the sensors may have different names, but the relationship between these sensors is similar. The optimal corresponding relationship between the sensors enables two relationship topologies to be most similar.

An application scene 2 of the embodiment of the present invention is introduced below in conjunction with FIG. 5.

Two factories may use similar devices, and sensors for monitoring these devices are also deployed similarly. In the two factories, since database providers are different, the names of the sensors may be different. In order to apply the knowledge of a factory to another factory (for example, the predictive maintenance knowledge of a factory is applied to another factory), it is necessary to determine a corresponding relationship between sensors in the two factories. According to sensor data of a factory, a relationship between various sensors in the factory may be determined, and a Pearson's correlation coefficient is taken as an input of adjacent matrices, so that a relationship topology between various sensors in the factory is established. The optimal corresponding relationship between the sensors enables relationship topologies corresponding to the two factories to be most similar.

Figure 6:
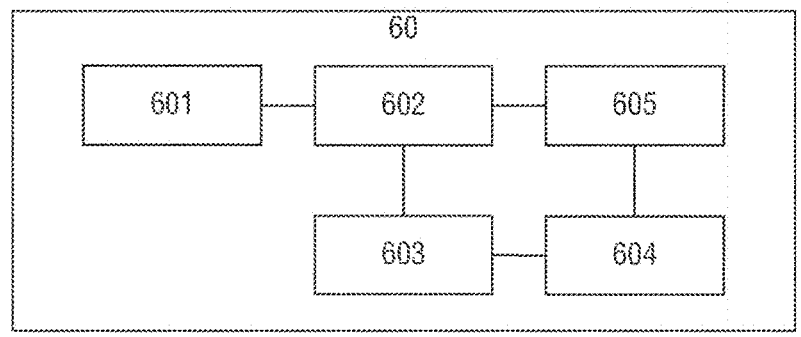
FIG. 6 is a structural schematic diagram of an industrial device matching apparatus provided in an embodiment of the present invention.

Based on the same inventive concept, the embodiment of the present invention also provides an industrial device matching apparatus 60. The apparatus may be used for the foregoing matching method. As shown in FIG. 6, the industrial device matching apparatus 60 may include:

a data collection module 601, configured to collect data of at least two industrial data sources;

a relationship determination module 602, configured to determine, for each of the at least two industrial data sources, a first relationship between various industrial devices in the industrial data source;

a topology determination module 603, configured to determine, for each of the at least two industrial data sources, a first relationship topology between the industrial devices in the industrial data source according to the determined first relationship between various industrial devices in the industrial data source; and a comparison module 604, configured to compare the first relationship topologies corresponding to the at least two industrial data sources, so as to determine a first corresponding relationship between industrial devices in industrial data sources, the first corresponding relationship enabling the first relationship topologies corresponding to the at least two industrial data sources to be similar.

Alternatively, the relationship determination module 602 is specifically configured to determine at least one of the following relationships between various industrial devices in the industrial data source:

a Pearson's correlation coefficient;

a frequency of co-occurrence in the industrial data source; and a positional relationship in the industrial data source.

Alternatively, the apparatus may further include a check module 605, configured to check a local part in the first corresponding relationship after the comparison module 604 determines the first corresponding relationship.

The relationship determination module 602 is further configured to determine, for each of the at least two industrial data sources, a second relationship between various industrial devices in the industrial data source if a check result of the check module 605 is wrong.

The topology determination module 603 is further configured to determine a second relationship topology between the industrial devices in the industrial data source according to the second relationship, determined by the relationship determination module 602, between various industrial devices in the industrial data source.

The comparison module 604 is further configured to compare the second relationship topologies corresponding to the at least two industrial data sources, so as to determine a second corresponding relationship between industrial devices in industrial data sources, the second corresponding relationship enabling the second relationship topologies corresponding to the at least two industrial data sources to be similar.

The second relationship is different from the first relationship, and/or, a comparison method adopted for comparing, by the comparison module 604, the second relationship topologies corresponding to the at least two industrial data sources is different from a comparison method adopted for comparing the first relationship topologies corresponding to the at least two industrial data sources.

Alternatively, the at least two industrial data sources are data sources in different systems in the same factory, and the at least two industrial data sources involve part of or all industrial devices in the factory.

Or, the at least two industrial data sources are data sources in different factories in which industrial devices have the similar layout, and the at least two industrial data sources involve part of or all industrial devices in the factories.

Other alternative implementation manners of the matching apparatus 60 may be referred to the foregoing matching method. Descriptions are omitted herein.

Figure 7:
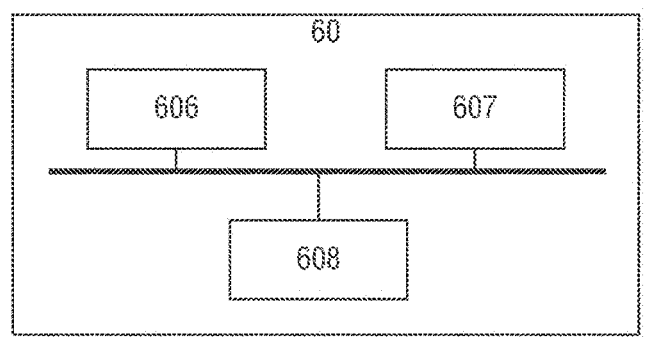
FIG. 7 is another structural schematic diagram of an industrial device matching apparatus provided in an embodiment of the present invention.

As shown in FIG. 7, in hardware implementation, the matching apparatus 60 may include:

at least one memory 606, configured to store a computer-readable code; and at least one processor 607, configured to call the computer-readable code to execute the matching method as shown in FIG. 1.

The at least one memory 606 and the at least one processor 607 may be connected through a bus. In addition, the matching apparatus 60 further includes a display 608. The display 608 may provide a graphical user interface (GUI). A user may select, through the GUI, an algorithm parameter such as a parameter for describing a relationship between various industrial devices in an industrial data source, and an algorithm adopted for comparing relationship topologies of different industrial data sources.

Various modules included in the matching apparatus 60 as shown in FIG. 6, namely the data collection module 601, the relationship determination module 602, the topology determination module 603, the comparison module 604 and the check module 605, may be regarded as program modules in a computer-readable code stored in the at least one memory 606 as shown in FIG. 7. The at least one processor 607 is configured to call the program modules to execute the matching method provided in the embodiment of the present invention.

In addition, each of the foregoing modules may also be regarded as each functional module implemented by combining hardware and software, to achieve various functions involved when the matching apparatus 60 executes the matching method. Each of the foregoing modules may also be regarded as each functional module implemented by hardware, which is used for achieving various functions involved when the matching apparatus 60 executes an access control method. For example, control logics of each flow involved in the matching method are fired into, for example, field-programmable gate arrays (FPGAs) chip or complex programmable logic devices (CPLDs) in advance. The function of each module is executed by these chips or devices. A specific implementation manner may be determined according to engineering practices.

In addition, the embodiment of the present invention also provides a computer-readable medium. The computer-readable medium has a computer-readable instruction stored thereon. When the computer-readable instruction is executed by a processor, the processor is enabled to execute the matching method as shown in FIG. 1. The embodiment of the computer-readable medium includes a floppy disk, a hard disk, a magnetic optical disc, an optical disc (such as CD-ROM, CD-R, CD-RW, DVD-ROM, DVD-RAM, DVD-RW, and DVD+RW), a magnetic tape, a nonvolatile memory card, and a ROM. Alternatively, the computer-readable instruction may be downloaded from a server computer or a cloud via a communication network.

In addition, the embodiment of the present invention also provides a computer program. The computer program may include a computer-readable instruction. When the computer-readable instruction is executed by a processor, the processor is enabled to execute the matching method as shown in FIG. 1.

In addition, the embodiment of the present invention also provides a computer program product. The computer program product is stored on a computer-readable medium tangibly and includes a computer-readable instruction. When the computer-readable instruction is executed by a processor, the processor is enabled to execute the method as shown in FIG. 1.

It should be noted that not all steps and modules in each flow and each system structure diagram are necessary, and some steps or modules may be omitted according to actual requirements. The performing sequence of various steps is not fixed, and may be adjusted as required. A system structure described in each of the foregoing embodiments may be a physical structure, or may be a logical structure. That is, some modules may be implemented by the same physical entity, or, some modules may be implemented by a plurality of physical entities or may be jointly implemented by certain components in a plurality of independent devices.

What is claimed is:

1. An industrial device matching method, comprising:
    receiving at least sensor data from sensors monitoring operations of at least two industrial data sources operating in a factory;
    for each respective industrial data source of the at least two industrial data sources,
        determining a first relationship between various industrial devices in each respective industrial data source of the at least two industrial data sources corresponding to received sensor data, and
        determining a first relationship topology between the industrial devices in each respective industrial data source according to the first relationship determined between various industrial devices in each respective industrial data source;
    comparing the first relationship topologies, respectively determined for each of respective industrial data source of the at least two industrial data sources; and
    determining an operational fault in an industrial data source by determining a first corresponding relationship between industrial devices in industrial data sources, the first corresponding relationship determined enabling the first relationship topologies, respectively corresponding to the respective industrial data sources of the at least two industrial data sources, to be similar;
    checking a local part in the first corresponding relationship;
    wherein upon the checking resulting in a determination that a check result is incorrect, for each respective industrial data source of the at least two industrial data sources,
        determining a second relationship between various industrial devices in each respective industrial data source of the at least two industrial data sources, and
        determining a second relationship topology between the industrial devices in each respective industrial data source according to the second relationship determined between various industrial devices in each respective industrial data source; and
        confirming the operational fault by comparing the second relationship topologies, respectively determined for each of respective industrial data source of the at least two industrial data sources, to determine a second corresponding relationship between industrial devices in industrial data sources, the second corresponding relationship determined enabling the second relationship topologies, respectively corresponding to the respective industrial data sources of the at least two industrial data sources, to be similar, wherein the second relationship is different from the first relationship.

2. The method of claim 1, wherein the determining of the relationship between various industrial devices in the industrial data source comprises:
    determining at least one relationship between various industrial devices in the industrial data source including:
    a Pearson's correlation coefficient;
    a frequency of co-occurrence in the industrial data source; and
    a positional relationship in the industrial data source.

3. The method of claim 1, wherein the respective data sources of the at least two industrial data sources are data sources in respectively different factories in which industrial devices have a similar layout, and wherein the respective data sources of the at least two industrial data sources involve part of or all industrial devices in the factories.

4. An industrial device matching apparatus, comprising:
   at least one memory, configured to store a computer-readable code; and
   at least one processor, configured to call the computer-readable code to execute at least:
   receiving at least sensor data from sensors monitoring operations of at least two industrial data sources operating in a factory;
   for each respective industrial data source of the at least two industrial data sources,
   determining a first relationship between various industrial devices in each respective industrial data source of the at least two industrial data sources corresponding to received sensor data, and
   determining a first relationship topology between the industrial devices in each respective industrial data source according to a second relationship determined between various industrial devices in each respective the industrial data source;
   comparing the first relationship topologies, respectively determined for each of respective industrial data source of the at least two industrial data sources; and
   determining an operational fault in an industrial data source by determining a first corresponding relationship determined enabling the first relationship topologies, respectively corresponding to the respective industrial data sources of the at least two industrial data sources, to be similar;
   checking a local part in the first corresponding relationship;
   wherein upon the checking resulting in a determination that a check result is incorrect, for each respective industrial data source of the at least two industrial data sources,
      determining the second relationship between various industrial devices in each respective industrial data source of the at least two industrial data sources, and
      determining a second relationship topology between the industrial devices in each respective industrial data source according to the second relationship determined between various industrial devices in each respective industrial data source; and
   confirming the operational fault by comparing the second relationship topologies, respectively determined for each of respective industrial data source of the at least two industrial data sources, to determine a second corresponding relationship between industrial devices in industrial data sources, the second corresponding relationship determined enabling the second relationship topologies, respectively corresponding to the respective industrial data sources of the at least two industrial data sources, to be similar, wherein the second relationship is different from the first relationship.

5. The apparatus of claim 4, wherein the at least one processor is further configured to call the computer-readable code determining at least one relationship between various industrial devices in the industrial data source, when determining a relationship between various industrial devices in the industrial data source, including:
   a Pearson's correlation coefficient;
   a frequency of co-occurrence in the industrial data source; and
   a positional relationship in the industrial data source.

6. The apparatus of claim 4, wherein the respective data sources of the at least two industrial data sources are respective data sources in respectively different factories in which industrial devices have a similar layout, and wherein the respective data sources of the at least two industrial data sources involve part of or all industrial devices in the factories.

7. A non-transitory computer-readable medium, having a computer-readable instruction stored thereon, wherein when the computer-readable instruction is executed by a processor, the processor is enabled to execute at least:
   receiving at least sensor data from sensors monitoring operations of at least two industrial data sources operating in a factory;
   for each respective industrial data source of the at least two industrial data sources,
   determining a first relationship between various industrial devices in each respective industrial data source of the at least two industrial data sources corresponding to received sensor data, and
   determining a first relationship topology between the industrial devices in each respective industrial data source according to the first relationship determined between various industrial devices in each respective industrial data source;
   comparing the first relationship topologies, respectively determined for each of respective industrial data source of the at least two industrial data sources;
   determining an operational fault in an industrial data source by determining a first corresponding relationship between industrial devices in industrial data sources, the first corresponding relationship determined enabling the first relationship topologies, respectively corresponding to the respective industrial data sources of the at least two industrial data sources, to be similar;
   checking a local part in the first corresponding relationship;
   wherein upon the checking resulting in a determination that a check result is incorrect, for each respective industrial data source of the at least two industrial data sources,
      determining a second relationship between various industrial devices in each respective industrial data source of the at least two industrial data sources, and
      determining a second relationship topology between the industrial devices in each respective industrial data source according to the second relationship determined between various industrial devices in each respective industrial data source; and
   confirming the operational fault by comparing the second relationship topologies, respectively determined for each of respective industrial data source of the at least two industrial data sources, to determine a second corresponding relationship between industrial devices in industrial data sources, the second corresponding relationship determined enabling the second relationship topologies, respectively corresponding to the respective industrial data sources of the at least two industrial data sources, to be similar, wherein the second relationship is different from the first relationship.

8. The non-transitory computer-readable medium of claim 7, wherein the processor is further configured to execute the computer-readable code determining at least one relationship between various industrial devices in the industrial data source when determining a relationship between various industrial devices in the industrial data source, including:

a Pearson's correlation coefficient;
a frequency of co-occurrence in the industrial data source; and
a positional relationship in the industrial data source.

9. The non-transitory computer-readable medium of claim 7, wherein
the respective data sources of the at least two industrial data sources are respective data sources in respectively different factories in which industrial devices have a similar layout, and wherein the respective data sources of the at least two industrial data sources involve part of or all industrial devices in the factories.

10. The method of claim 1, wherein a comparison method adopted for comparing the second relationship topologies corresponding to the at least two industrial data sources is different from a comparison method adopted for comparing the first relationship topologies corresponding to the at least two industrial data sources.

11. The method of claim 1, wherein after the determining of the first corresponding relationship, the method further comprises:
checking a local part in the first corresponding relationship; and
wherein upon the checking resulting in a determination that a check result is incorrect, for each respective industrial data source of the at least two industrial data sources,
determining a second relationship between various industrial devices in each respective industrial data source of the at least two industrial data sources, and
determining a second relationship topology between the industrial devices in each respective industrial data source according to the second relationship determined between various industrial devices in each respective industrial data source; and
comparing the second relationship topologies, respectively determined for each of respective industrial data source of the at least two industrial data sources, to determine a second corresponding relationship between industrial devices in industrial data sources, the second corresponding relationship determined enabling the second relationship topologies, respectively corresponding to the respective industrial data sources of the at least two industrial data sources, to be similar,
wherein a comparison method adopted for comparing the second relationship topologies corresponding to the at least two industrial data sources is different from a comparison method adopted for comparing the first relationship topologies corresponding to the at least two industrial data sources.

12. The apparatus of claim 4, wherein a comparison method adopted for comparing the second relationship topologies corresponding to the at least two industrial data sources is different from a comparison method adopted for comparing the first relationship topologies corresponding to the at least two industrial data sources.

13. The apparatus of claim 4, wherein the at least one processor is further configured to call the computer-readable code to execute, after determining the first corresponding relationship, at least:
checking a local part in the first corresponding relationship; and
wherein upon the checking resulting in a determination that a check result is incorrect, for each respective industrial data source of the at least two industrial data sources,
determining a second relationship between various industrial devices in each respective industrial data source of the at least two industrial data sources, and
determining a second relationship topology between the industrial devices in each respective industrial data source according to the second relationship determined between various industrial devices in each respective industrial data source; and
comparing the second relationship topologies, respectively determined for each of respective industrial data source of the at least two industrial data sources, to determine a second corresponding relationship between industrial devices in industrial data sources, the second corresponding relationship determined enabling the second relationship topologies, respectively corresponding to the respective industrial data sources of the at least two industrial data sources, to be similar,
wherein a comparison method adopted for comparing the second relationship topologies corresponding to the at least two industrial data sources is different from a comparison method adopted for comparing the first relationship topologies corresponding to the at least two industrial data sources.

14. The non-transitory computer-readable medium of claim 7, the processor is further configured to execute the computer-readable code to perform at least a comparison method, wherein the comparison method adopted for comparing the second relationship topologies corresponding to the at least two industrial data sources is different from a comparison method adopted for comparing the first relationship topologies corresponding to the at least two industrial data sources.

15. The method of claim 1, wherein the respective data sources of the at least two industrial data sources are respective data sources in respectively different systems in a same factory, and wherein the respective data sources of the at least two industrial data sources involve part of or all industrial devices in the factory.

16. The apparatus of claim 4, wherein the respective data sources of the at least two industrial data sources are respective data sources in respectively different systems in a same factory, and wherein the respective data sources of the at least two industrial data sources involve part of or all industrial devices in the factory.

17. The non-transitory computer-readable medium of claim 7, wherein the respective data sources of the at least two industrial data sources are respective data sources in respectively different systems in a same factory, and wherein the respective data sources of the at least two industrial data sources involve part of or all industrial devices in the factory.

* * * * *